United States Patent [19]

Dykstra et al.

[11] Patent Number: 5,197,433

[45] Date of Patent: Mar. 30, 1993

[54] ANTICIPATORY INTAKE MANIFOLD TUNING VALVE CONTROL

[76] Inventors: Gregory J. Dykstra, 1611 Anita; Glen E. Tallarek, 1774 Aline Dr., both of Grosse Pointe Woods, Mich. 48236

[21] Appl. No.: 876,632

[22] Filed: Apr. 30, 1992

[51] Int. Cl.[5] ............................................. F62M 35/10
[52] U.S. Cl. .............................. 123/52 MB; 123/350
[58] Field of Search .......... 123/52 MB, 52 M, 52 MC, 123/52 MV, 350

[56] References Cited

U.S. PATENT DOCUMENTS

| | | | |
|---|---|---|---|
| 4,570,590 | 2/1986 | Kawai et al. | 123/52 M |
| 4,738,233 | 4/1988 | Hitomi et al. | 123/52 MB |
| 4,765,286 | 8/1988 | Lyjak et al. | 123/52 MB |
| 5,090,202 | 2/1992 | Hitomi et al. | 123/52 MB |
| 5,113,826 | 5/1992 | Anzai | 123/52 MB |
| 5,123,382 | 6/1992 | Aoki et al. | 123/52 MB |
| 5,129,368 | 7/1992 | Kristl et al. | 123/52 MB |

*Primary Examiner*—David A. Okonsky
*Attorney, Agent, or Firm*—Mark P. Calcaterra

[57] ABSTRACT

A method of controlling an intake manifold tuning valve (MTV) for an internal combustion engine includes the steps of sensing the position of the throttle, determining whether the throttle position is greater than or equal to wide open throttle (WOT), and opening the intake MTV if the throttle position is not greater than or equal to WOT. The method also includes the steps of sensing the speed of the engine if the throttle position is greater than or equal to WOT, determining whether the engine speed is outside a first and second predetermined speeds, closing the intake MTV if the engine speed is outside the range between first and second predetermined speeds and opening the intake MTV if the engine speed is not outside the range between first and second predetermined speeds.

13 Claims, 8 Drawing Sheets

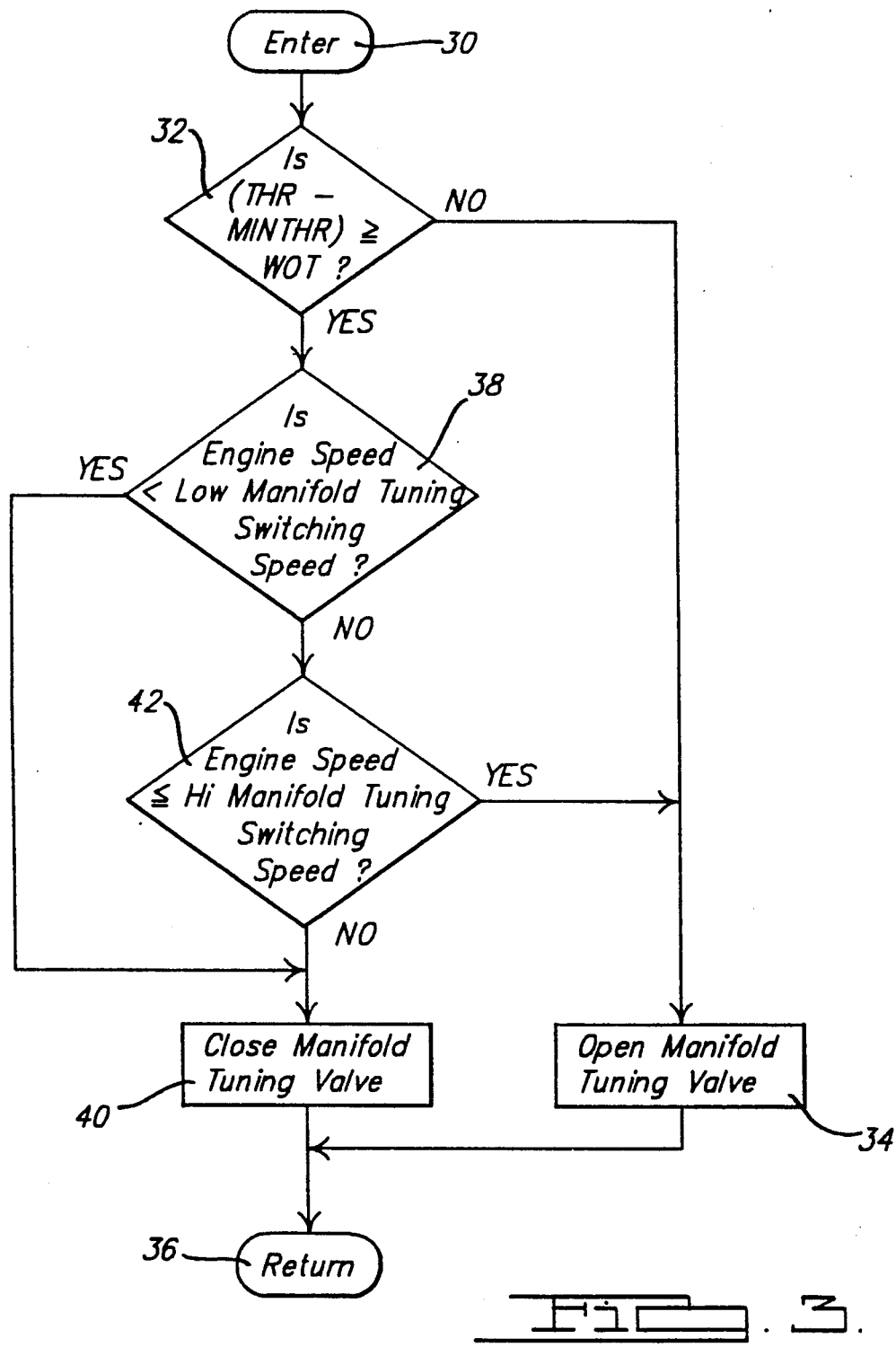

5,197,433

ANTICIPATORY INTAKE MANIFOLD TUNING VALVE CONTROL

BACKGROUND OF THE INVENTION

1. Field of the Invention

The present invention relates generally to internal combustion engines, and more particularly to, a method of controlling engine torque output of an internal combustion engine.

2. Description of the Related Art

Generally, to enhance torque output performance of an internal combustion engine, a multi-cylinder engine is designed with a "tuned" intake manifold (air induction system). Tuning is accomplished by matching induction system design parameters (runner lengths and diameters, plenum volumes, etc.) to create charge air pressure pulse peaks (a wave dynamics phenomenon) near the cylinder intake valves at certain engine "tuning" speeds. These charge air pressure pulse peaks near the cylinder intake valves cause more charge air to be inducted into the cylinder when the intake valves are open. The induction system can be designed to perform tuning at one mid range speed (first order system) or at two separate speeds (second order system).

Accordingly, there is a need in the art to switch the induction system between a first and second order system so that tuning is achieved across a wider engine speed band, resulting in a higher overall engine torque output curve. There is also a need in the art to include anticipatory functions to account for inherent time delays between an engine controller switching of a vacuum solenoid that controls an intake manifold tuning valve (MTV) and the actual valve closing or opening. Further, there is a need in the art to switch the intake MTV at precisely equal engine torque levels for a first and second order system to prevent perceivable engine performance degradation.

SUMMARY OF THE INVENTION

It is, therefore, one object of the present invention to switch an induction system between a first and second order system so that tuning is achieved across a wider engine speed band.

It is another object of the present invention to control an intake MTV by including anticipatory functions to account for inherent time delays between solenoid switching and actual valve closing or opening.

It is yet another object of the present invention to provide an intake MTV which is switched at speeds where the first and second order systems produce equal torque levels.

It is a further object of the present invention to enhance torque output and performance of an internal combustion engine.

Accordingly, the present invention is a method of controlling an intake manifold tuning valve (MTV) for an internal combustion engine. The method includes the steps of sensing the position of the throttle, determining whether the throttle position is greater than or equal to "wide open throttle" (WOT), and switching a solenoid to open the intake MTV if the throttle position is not greater than or equal to WOT. The method also includes the steps of sensing the rotational speed of the engine if the throttle position is greater than or equal to WOT and closing the intake MTV (if the engine speed is below a predetermined low speed value or is above a predetermined high speed value) or opening the intake MTV (if the engine speed is equal to or between the predetermined low speed value and the predetermined high speed value).

One advantage of the present invention is that an "active" intake manifold or induction system is provided which allows switching, via the MTV, between a first and second order tuning system. Another advantage of the present invention is that the switching allows a high engine torque output across a wider engine speed range by obtaining the intake tuning at a mid range speed of a first order system (valve open) and the intake tuning of a second order system (valve closed) at two engine speeds adjacent to the mid range speed. Yet another advantage of the present invention is that the intake MTV is switched at engine speeds where the first and second order intake tuning produces equal engine torque and prevents perceivable performance degradation. A further advantage of the present invention is that anticipatory functions are provided to account for the inherent delay between the switching of the intake MTV solenoid (by the engine controller) and the actual valve opening or closing. A still further advantage of the present invention is that the anticipatory intake MTV control feature switches a solenoid that applies engine vacuum to the pneumatic intake MTV at exactly the correct engine speeds to achieve maximum engine performance.

Other objects, features and advantages of the present invention will be readily appreciated as the same becomes better understood after reading the following description taken in conjunction with the accompanying drawings.

BRIEF DESCRIPTION OF THE DRAWINGS

FIG. 3 is a flowchart of an overall intake MTV control methodology according to the present invention.

DESCRIPTION OF THE PREFERRED EMBODIMENT(S)

Figure 1:
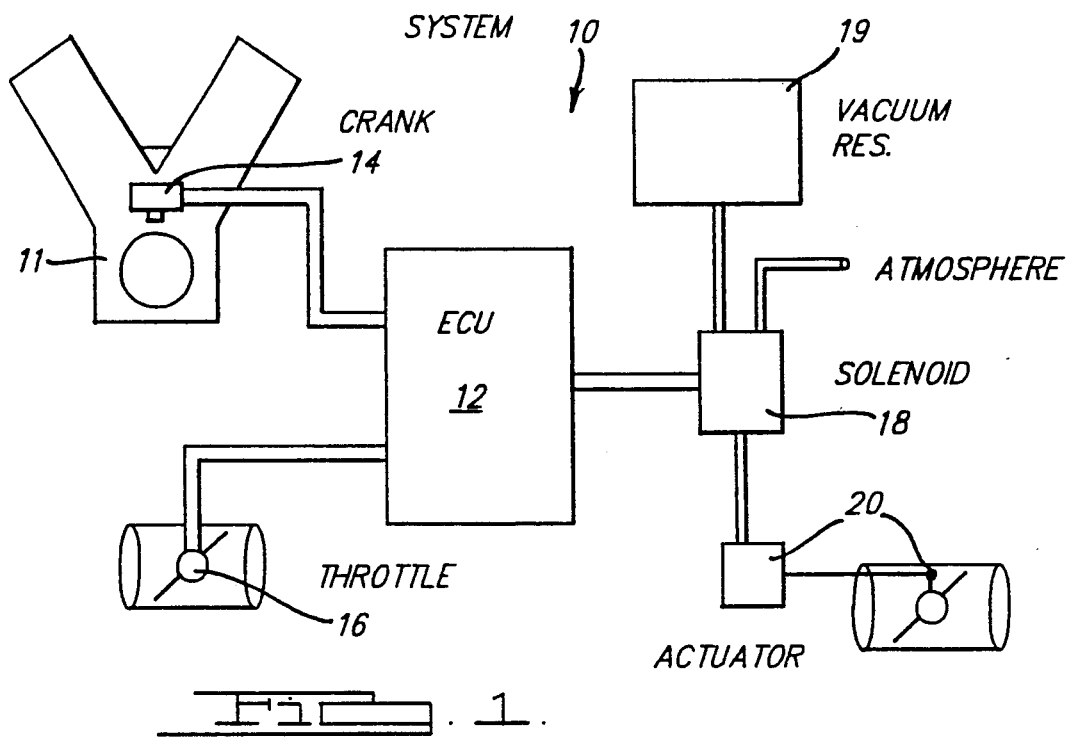
FIG. 1 is a schematic diagram of a hardware system for an anticipatory intake MTV control methodology according to the present invention.

Referring to FIG. 1, a control system 10 is shown for an internal combustion engine 11. The internal combustion engine 11 includes a conventional induction system (not shown). The control system 10 includes an engine controller or Electronic Control Unit (ECU) 12. The ECU 12 includes a microprocessor, memory (address, control and data) bus lines and other hardware and software to perform tasks of engine control. The control system 10 also includes a crank shaft sensor 14 connected to the ECU 12 and internal combustion engine to measure the speed of the crankshaft or engine 11. The control system 10 includes a throttle position sensor 16 connected to the ECU 12 and internal combustion engine 11 for sensing the position of the throttle. The control system 10 further includes a solenoid 18 connected to the ECU 12. The solenoid 18 controls the application of vacuum from a vacuum reservoir 19a to an actuator system 19b for an intake manifold tuning valve (MTV) 20, thereby controlling the tuning characteristics of the intake manifold and the quantity of air inducted into the engine 11. It should be appreciated that the control system 10 may include other hardware and software to carry out or perform the intake MTV control methodology to be described.

Figure 2:
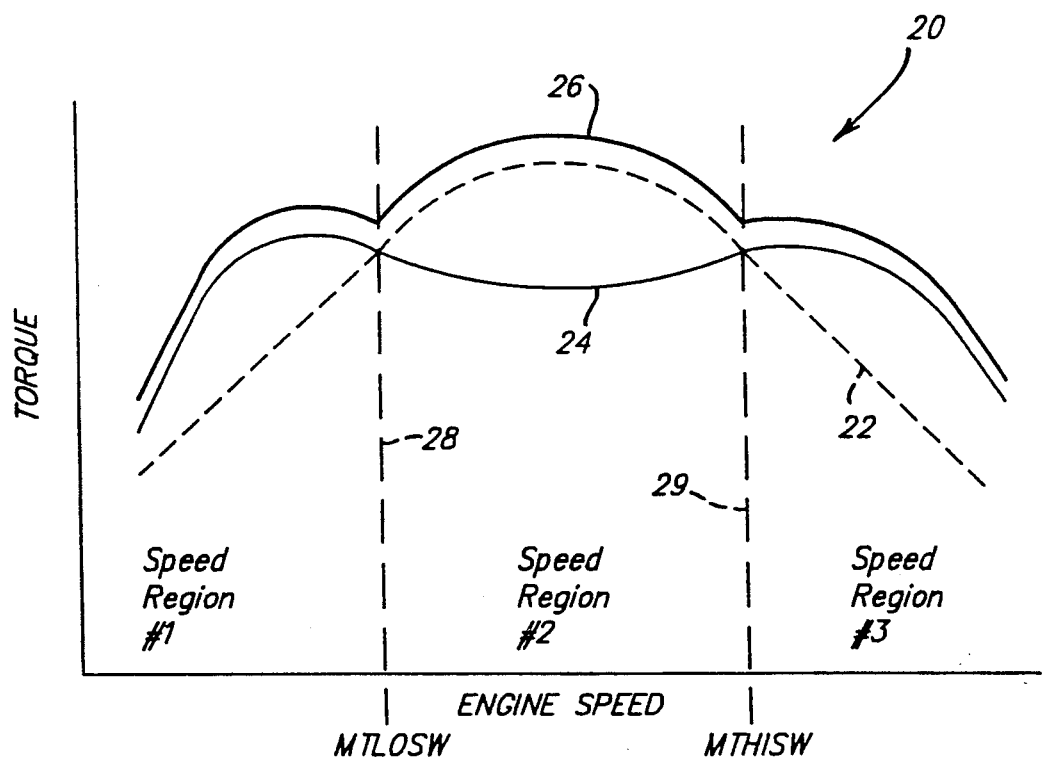
FIG. 2 is a graph of engine torque with active intake manifold.

Referring to FIG. 2, a graph of engine torque with active intake manifold or induction system is shown at 20. The graph 20 is a plot of engine torque versus engine speed for the internal combustion engine. The graph 20 a curve 22 of first order tuning, a curve 24 of second order tuning and a curve 26 of active tuning. The anticipatory intake MTV control methodology to be described switches the solenoid 18 at a first engine speed (MTLOSW) 28 and a second engine speed (MTHISW) 29 to produce points of equal engine torque, represented by the intersection of curves 22 and 24. The result is the active tuning curve 26.

Referring to FIG. 3, a flowchart of an overall intake MTV control methodology, according to the present invention, is shown. The methodology enters through bubble 30 and advances to decision block 32. In decision block 32, the methodology determines whether the position of the throttle is greater than or equal to wide open throttle (WOT). This is accomplished by the throttle position sensor 16 sensing the position of the throttle and sending an appropriate signal to the ECU 12 which is compared against a predetermined value such as 2.4 Volts for WOT stored in memory. If the throttle is not greater than or equal to WOT, the methodology advances to block 34 and opens the intake MTV 20. The methodology then returns through bubble 36.

In decision block 32, if the throttle is greater than or equal to WOT, the methodology advances to decision block 38 and determines whether engine speed (RPMX8) is less than a predetermined low manifold tuning switching speed (MTLOSW). The engine speed (RPMX8) is calculated in the ECU 12 using the time between engine crankshaft position pulses sensed by the crankshaft sensor 14. The engine speed (RPMX8) is compared against a predetermined value such as 3000 RPM for MTLOSW stored in memory of the ECU 12. If so, the methodology advances to block 40 and closes the intake MTV 20. The methodology then returns through bubble 36.

If RPMX8 is not less than MTLOSW, the methodology advances to decision block 42 and determines whether RPMX8 is less than or equal to a predetermined high manifold tuning switching speed (MTHISW). This is accomplished by comparing RPMX8 against a predetermined value such as 4300 RPM for MTHISW stored in memory of the ECU 12. If so, the methodology advances to block 34 previously described to open the intake MTV 20. If RPMX8 is not less than or equal to MTHISW, the methodology advances to block 40 and closes the intake MTV 20. From blocks 34 and 40, the methodology returns through bubble 36 previously described. It should be appreciated that the intake MTV 20 is open and closed by energization and de-energization of the solenoid 18 by the ECU 12.

Figure 4A:
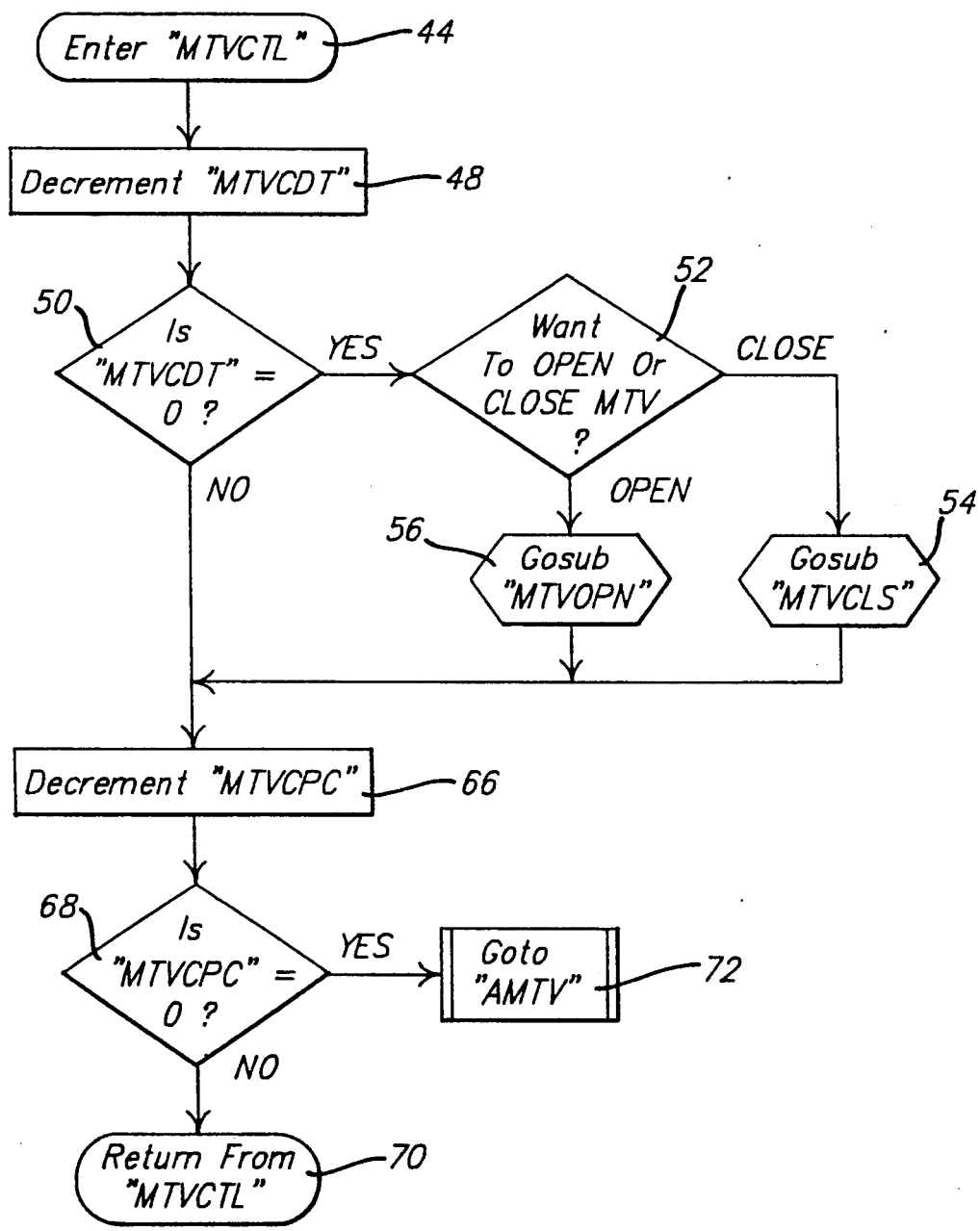
FIGS. 4A through 4G are flowcharts of a detailed anticipatory intake MTV control methodology according to the present invention.

Referring to FIGS. 4A through 4G, a detailed anticipatory intake MTV control methodology, according to the present invention, is shown. In FIG. 4A, the methodology (MTVCTL) enters through bubble 44 from a "2 millisecond interrupt" routine in the existing software of the ECU 12. The methodology includes an automatic MTV activation section and an anticipatory MTV (AMTV) control calculation section. From block 44, the methodology advances to block 48 and decrements an MTV count down timer (MTVCDT). The methodology then advances to decision block 50 and determines whether the value of MTVCDT is equal to a predetermined value such as zero (0). If so, the methodology advances to decision block 52 and determines whether the intake MTV 20 is to be open or closed. If the intake MTV 20 is to be closed, the methodology advances to block 54 and performs a "MTV close" (MTVCLS) subroutine to be described in FIG. 4G. If the intake MTV 20 is to be open, the methodology advances to block 56 and performs a "MTV open" (MTVOPN) subroutine to be described in FIG. 4G.

Figure 4B:
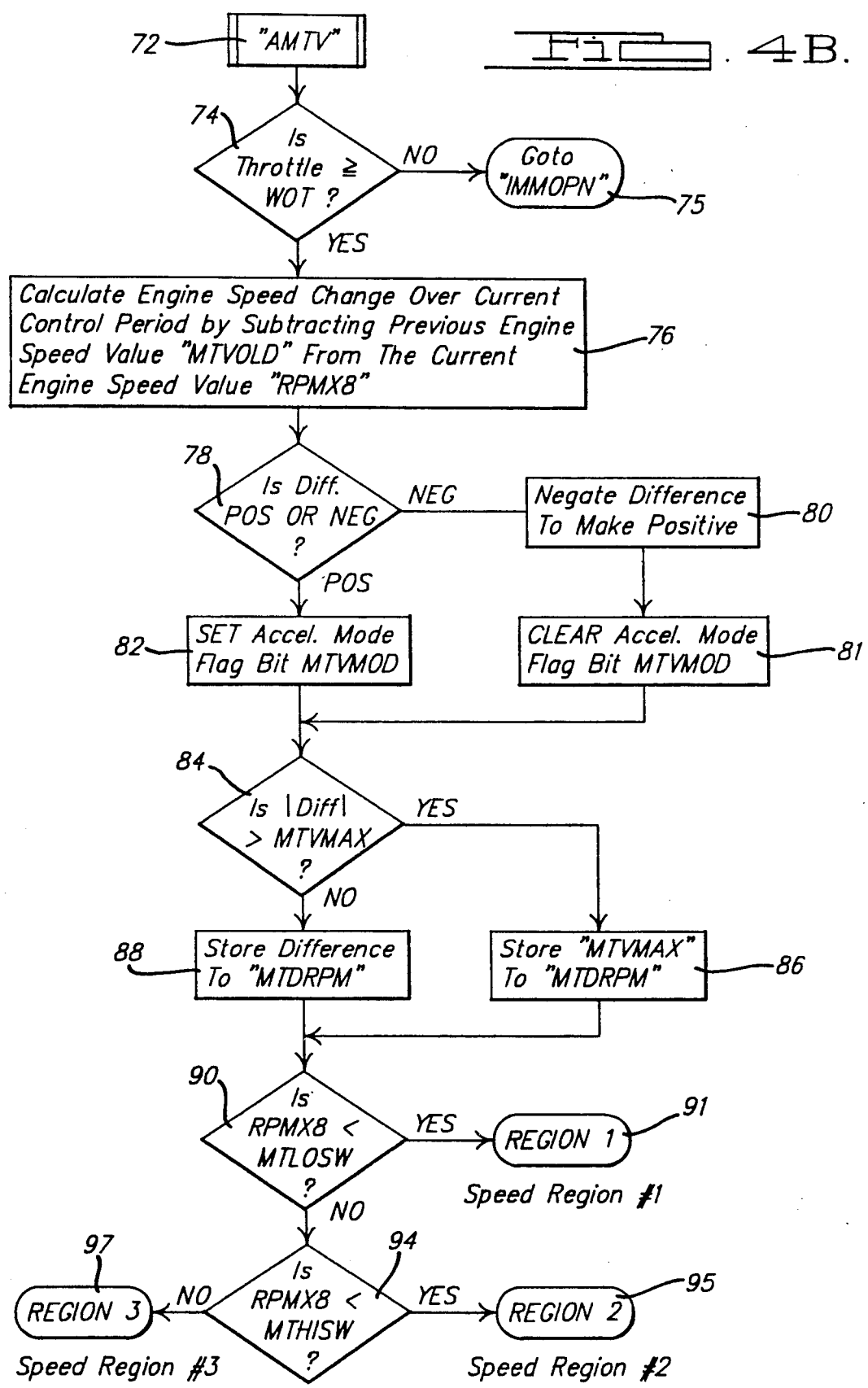
Figure 4C:
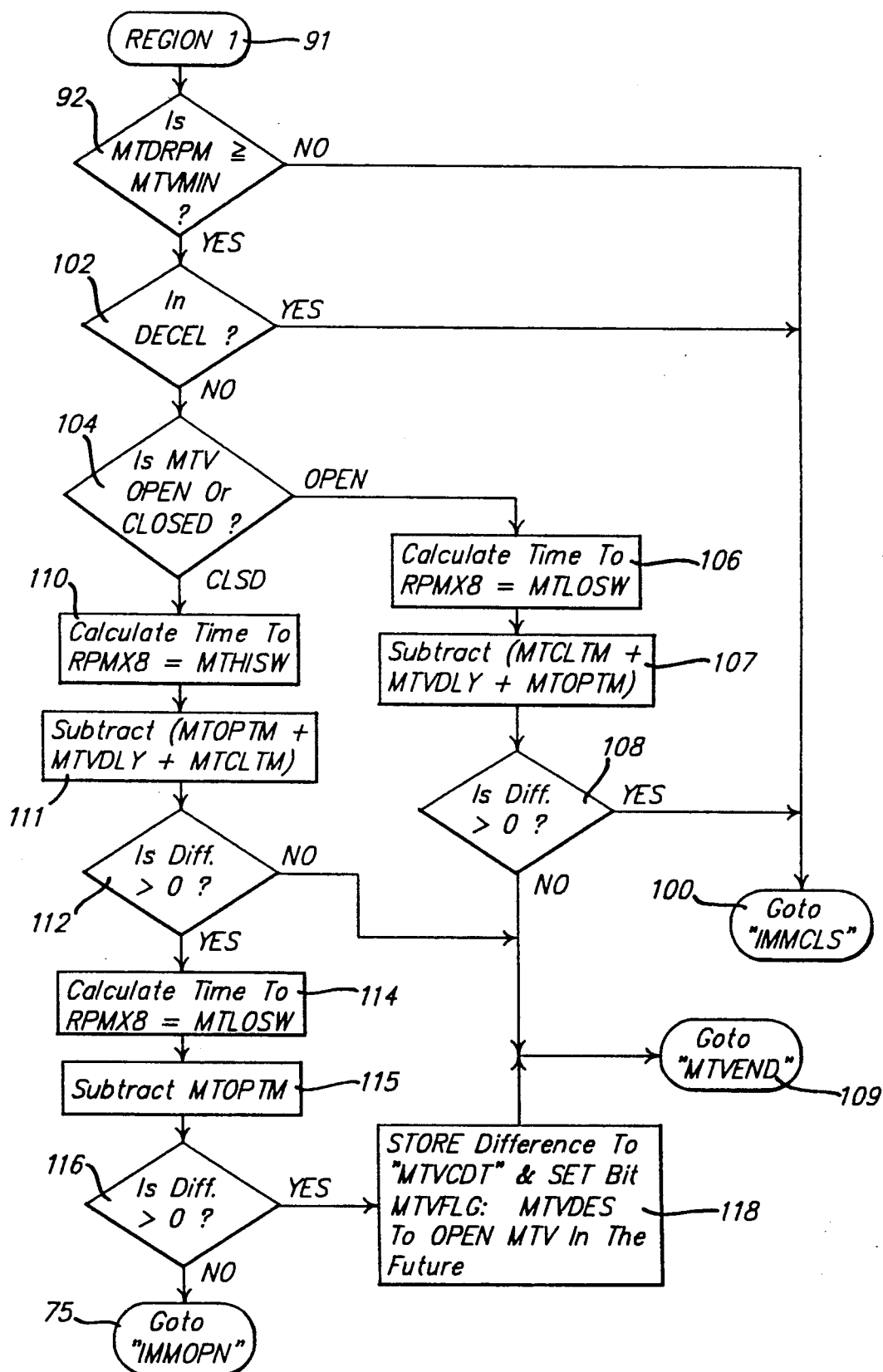
Figure 4D:
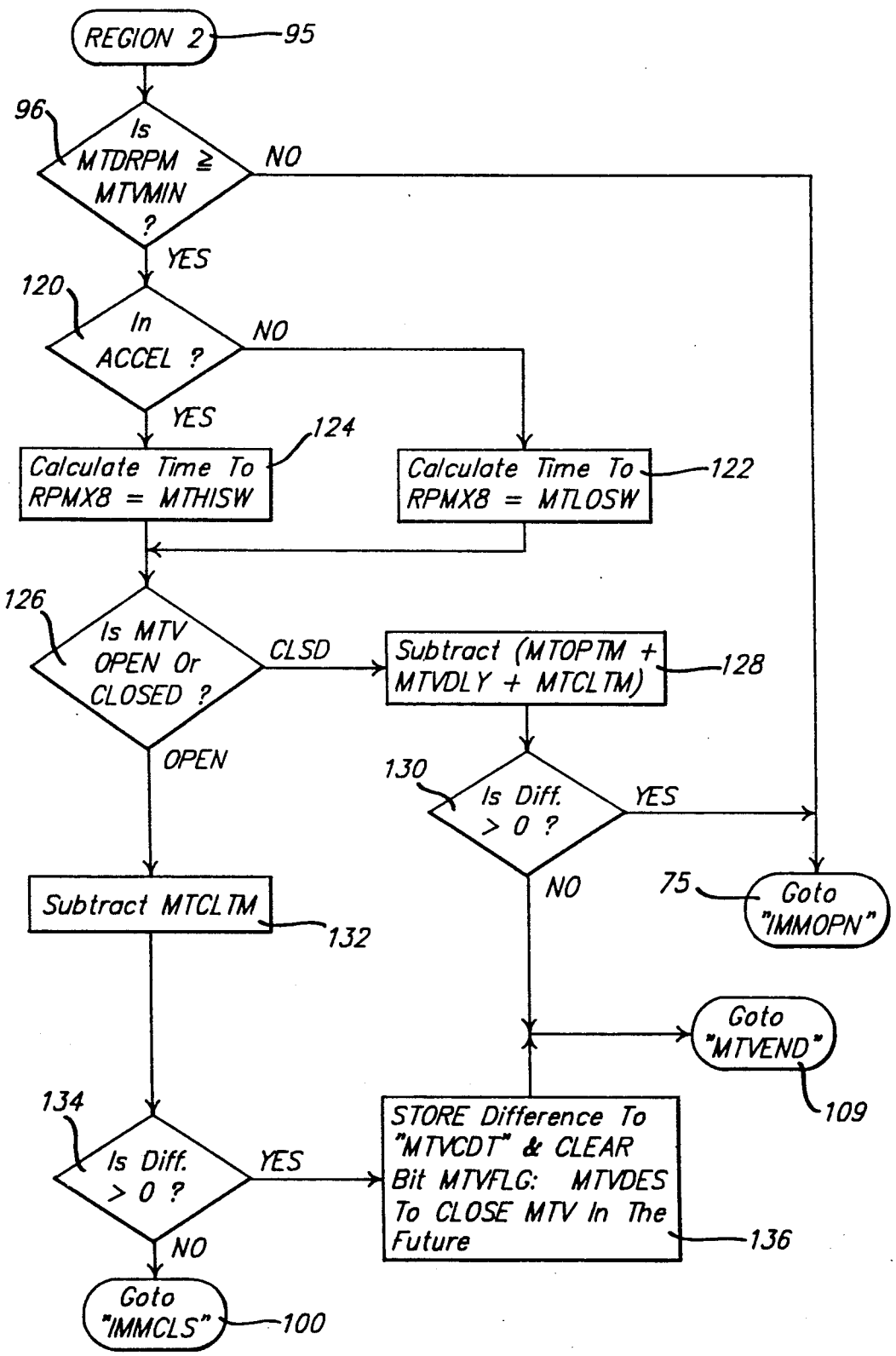
Figure 4E:
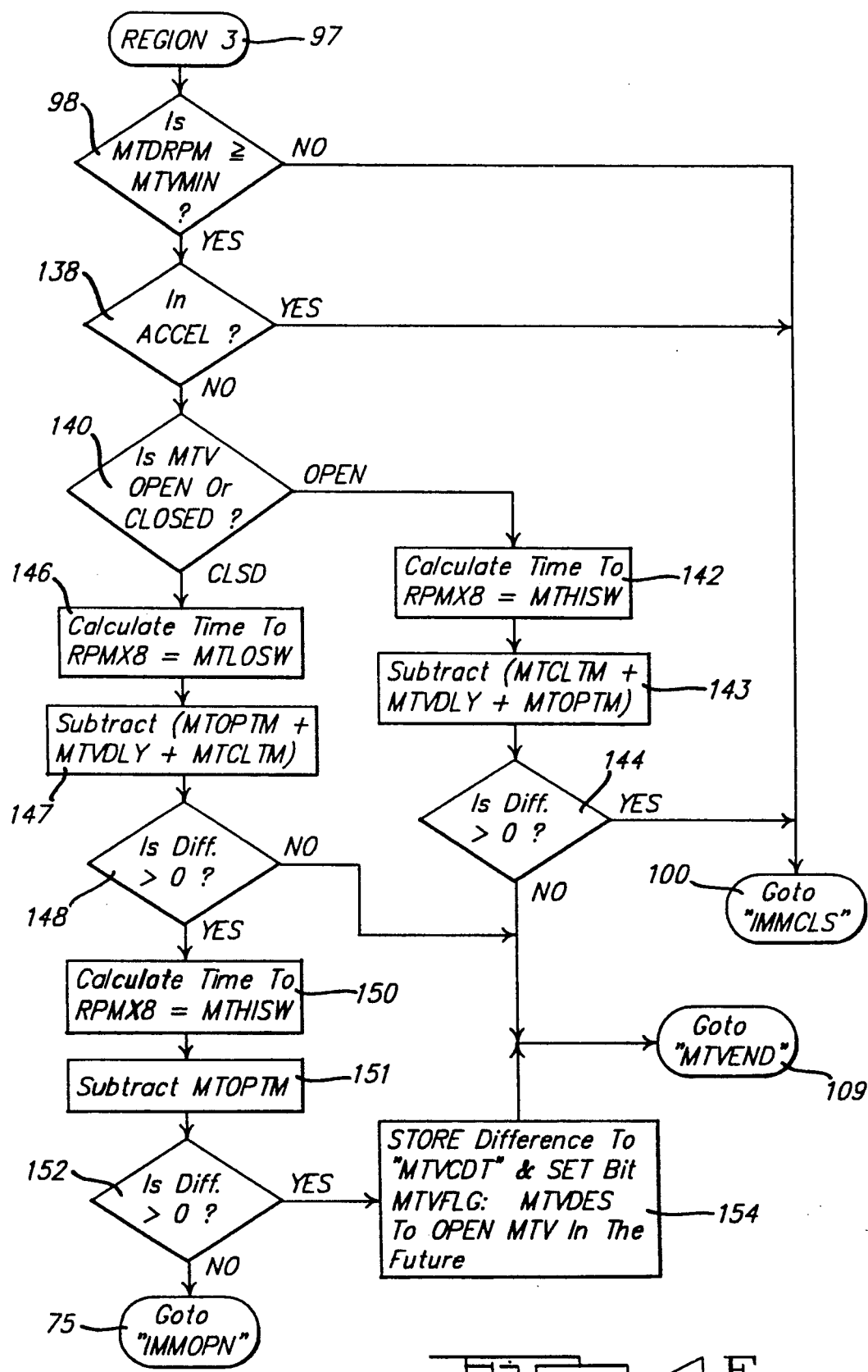
Figure 4F:
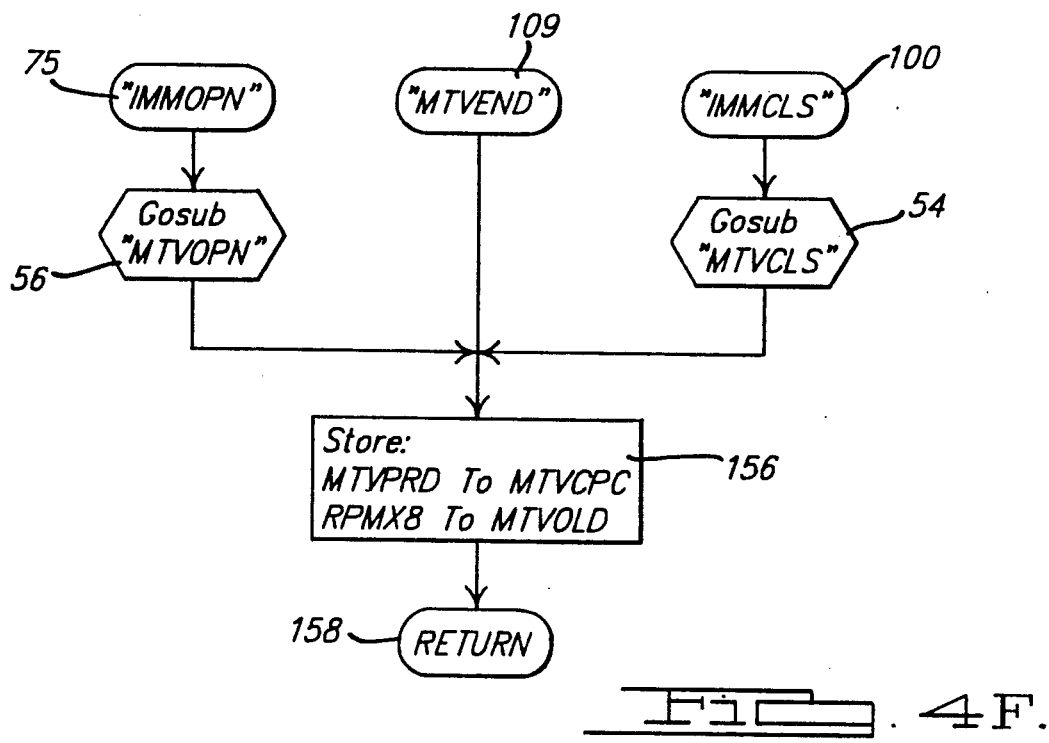
Figure 4G:
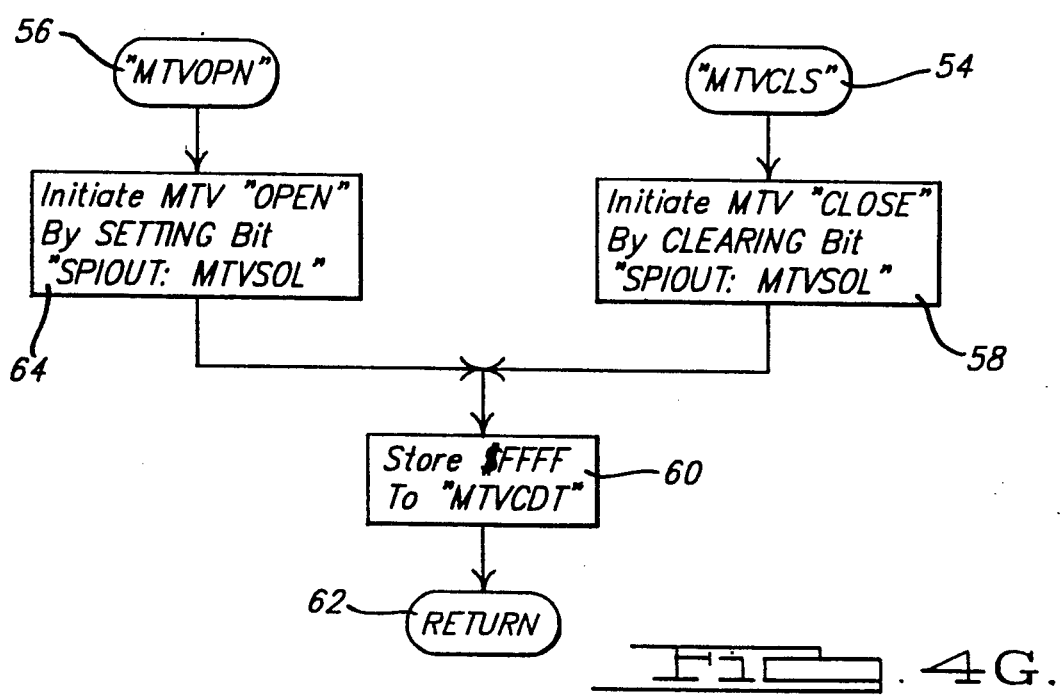

Referring to FIG. 4G, when the MTVCLS subroutine is to be performed, the methodology advances from block 54 to block 58 and initiates MTV "CLOSE" by clearing a MTV solenoid control bit (SPIOUT:MTVSOL) to zero (0). The methodology then advances to block 60 and stores a value ($FFFF) to MTVCDT so that another switch event does not occur. The methodology then returns through bubble 62.

When the MTVOPN subroutine is to be performed, the methodology advances from block 56 to block 64 in FIG. 4G and initiates MTV "OPEN" by setting the MTV solenoid control bit (SPIOUT:MTVSOL) to one (1). The methodology then advances to block 60 and stores a value ($FFFF) to MTVCDT so that another switch event does not occur. The methodology then returns through bubble 62.

Referring to FIG. 4A, once the subroutines in blocks 54 and 56 have been completed or MTVCDT is not equal to the predetermined value such as zero in decision block 50, the methodology advances to block 66 and decrements a MTV control period counter (MTVCPC). The methodology then advances to decision block 68 and determines whether MTVCPC is equal to a predetermined value such as zero (0). If not, the methodology returns through bubble 70. If so, the methodology advances to block 72 and performs the AMTV subroutine to be described in FIGS. 4B through 4F.

Referring to FIG. 4B, the methodology enters the AMTV subroutine through block 72. The anticipatory MTV control calculation section is performed only once in every "control period". The length of the "control period" is a multiple of 2 mS interrupts. The number of 2 mS interrupts per "control period" is stored in the 1-byte ROM location "MTVPRD" (MTV Period). The AMTV subroutine is finalized by copying the value from MTVPRD to MTVCPC in block 156 of FIG. 4F. Thereafter, MTVCPC is decremented by 1 every 2 mS interrupt until it reaches zero (0). When MTVCPC reaches zero, the AMTV subroutine is executed.

From block 72, the methodology advances to decision block 74. In decision block 74, the methodology determines whether the position of the throttle as sensed by sensor 16 is greater than or equal to wide open throttle (WOT). If the throttle is not greater than or equal to WOT, the methodology advances to bubble 75 in FIG. 4F to be described. If the throttle is greater than or equal to wide open throttle, the methodology advances to block 76 and calculates engine speed change over the current control period. This is accomplished by subtracting the previous engine speed value (MTVOLD) from the current engine speed value (RPMX8). The methodology then advances to decision block 78 and determines whether the difference calculated in previous block 76 is positive (engine is accelerating) or negative (engine is decelerating). If negative, the methodology advances to block 80 and negates the difference to make positive (to yield its absolute value). The methodology advances to block 81 and clears the acceleration mode flag bit (MTVMOD). If the difference is positive in decision block 78, the methodology advances to block 82 and sets the acceleration mode flag bit (MTVMOD). From blocks 81 and 82, the methodology advances to decision block 84.

In decision block 84, the methodology determines whether the absolute value of the difference calculated in block 76 is greater than a predetermined maximum value that is stored in a 1-byte ROM location "MTVMAX". If so, the methodology advances to block 86 and stores MTVMAX to a 2-byte RAM location MTDRPM (Delta RPM). If not, the methodology advances to block 88 and stores the difference to MTDRPM. From blocks 86 and 88, the methodology then advances to decision block 90.

In decision block 90, the methodology determines whether engine speed (RPMX8) is less than MTLOSW. If RPMX8 is less than MTLOSW, the methodology advances through bubble 91 to decision block 92 in FIG. 4C to be described. If RPMX8 is not less than MTLOSW, the methodology advances to decision block 94 and determines whether RPMX8 is less than MTHISW. If RPMX8 is less than MTHISW, the methodology advances through bubble 95 to decision block 96 in FIG. 4D to be described. If RPMX8 is not less than MTHISW, the methodology advances through bubble 97 to decision block 98 in FIG. 4E to be described.

Referring to FIG. 4C, in decision block 92, the methodology determines whether the engine speed change over the last control period MTDRPM is greater than or equal to a predetermined minimum value (MTVMIN). If not, the methodology advances to bubble 100 in FIG. 4F to be described. If MTDRPM is greater than or equal to MTVMIN, the methodology advances to decision block 102 and checks the state of the acceleration mode flag bit (MTVMOD) to determine whether the engine is in deceleration (decel). If the engine is decelerating (e.g., if MTVMOD=0), the methodology advances to bubble 100 to be described. If the engine is not decelerating (e.g., MTVMOD=1), the methodology advances to decision block 104 and checks the state of the MTV solenoid control bit (SPI-OUT:MTVSOL) to determine whether the intake MTV 20 is currently open or closed (in engine lower Region #1 of FIG. 2, the desired state of the intake MTV 20 is "closed" if the throttle is at WOT). If the intake MTV 20 is currently open, the methodology advances to a section that determines if there is enough time to close the intake MTV 20 before it is desired to open the intake MTV 20 again when the engine speed RPMX8 reaches the low manifold tuning switching speed (MTLOSW).

In block 106, the methodology calculates the approximate time for RPMX8 to reach MTLOSW. The time for RPMX8 to reach MTLOSW is calculated by dividing the difference of MTLOSW−RPMX8 by the engine speed change over the last control period MTDRPM. The resulting quotient is converted into the number of 2 mS interrupts that it would take for RPMX8 to reach MTLOSW if the engine speed changed at the constant rate of MTDRPM per control period. The methodology then advances to block 107 to account for the inherent time delays between energization and de-energization of the solenoid 18 and the mechanical characteristics of the actuation system 19b. In block 107, the time to close the valve 20 (MTCLTM), pause (MTVDLY), then open the valve 20 (MTOPTM) are subtracted from the time it is expected to take for RPMX8 to reach MTLOSW. The methodology then advances to decision block 108 and determines if the difference between blocks 106 and 107 is greater than zero (0). If the difference is greater than zero (e.g., there is sufficient time to close, pause, and open the intake MTV 20 before RPMX8=MTLOSW), the methodology advances to bubble 100 to be described (immediately close the intake MTV 20). If the difference is less than or equal to zero (e.g., there is not sufficient time to close, pause, and open the intake MTV 20 before RPMX8=MTLOSW), the methodology advances to bubble 109 in FIG. 4F to be described (exit the routine).

Referring back to decision block 104, if the intake MTV 20 is currently closed, the methodology advances to a section that determines if there is enough time to open the intake MTV 20 before it is desired to close the intake MTV 20 again when the engine speed RPMX8 reaches the high manifold tuning switching speed (MTHISW). In block 110, the methodology calculates the approximate time for RPMX8 to reach MTHISW. The time for RPMX8 to reach MTHISW is calculated by dividing the difference of MTHISW−RPMX8 by the engine speed change over the last control period MTDRPM. The resulting quotient is converted into the number of 2 mS interrupts that it would take for RPMX8 to reach MTHISW if the engine speed changed at the constant rate of MTDRPM per control period. The methodology then advances to block 111 to account for the inherent time delays of the actuation system 19b as previously described. In block 111, the time to open the valve 20 (MTOPTM), pause (MTVDLY), then close the valve 20 (MTCLTM) are subtracted from the time it is expected to take for RPMX8 to reach MTHISW. The methodology then advances to decision block 112 and determines if the difference between blocks 110 and 111 is greater than zero (0). If the difference is less than or equal to zero (e.g., there is not sufficient time to open, pause, and close the intake MTV 20 before RPMX8=MTHISW), the methodology advances to bubble 109 to be described (exit the routine). If the difference is greater than zero (e.g., there is sufficient time to open, pause, and close the intake MTV 20 before RPMX8=MTHISW), the methodology advances to block 114 and calculates the approximate time for RPMX8 to reach MTLOSW. The time for RPMX8 to reach MTLOSW is calculated by dividing the difference of MTLOSW−RPMX8 by the engine speed change over the last control period MTDRPM. The resulting quotient is converted into the number of 2 mS interrupts that it would take for RPMX8 to reach MTLOSW if the engine speed changed at the constant rate of MTDRPM per control period. The methodology then advances to block 115 to account for the inherent time delays of the actuation system 19b as previously described. In block 115, the time to open the valve 20 (MTOPTM) is subtracted from the time it is expected to take for RPMX8 to reach MTLOSW. The methodology then advances to decision block 116 and determines if the difference between blocks 114 and 115 is greater than zero (0). If the difference is less than or equal to zero (e.g., there is not sufficient time to open the intake MTV 20 before RPMX8=MTLOSW), the methodology advances to bubble 75 to be described (immediately open the intake MTV 20). If the difference is greater than zero (e.g., there is sufficient time to open the intake MTV 20 before RPMX8=MTLOSW), the methodology advances to block 118 and stores the difference to the MTV Count-Down Timer (MTVCDT) and sets the MTV desired flag bit (e.g., MTVFLG:MTVDES=1) to signify "open valve" is desired when MTVCDT reaches zero. The methodology then advances to bubble 109 in FIG. 4F to be described (exit the routine).

Referring to FIG. 4D, in decision block 96, the methodology determines whether MTDRPM is greater than or equal to MTVMIN. If not, the methodology advances to bubble 75 to be described. If so, the methodology advances to decision block 120 and determines whether the engine is in acceleration (accel). If the engine is in an acceleration (e.g., MTVMOD=1), the methodology advances to block 124 and calculates the time for RPMX8 to reach MTHISW, as previously described. If the engine is not in an acceleration (e.g., MTVMOD=0), the methodology advances to block 122 and calculates the time for RPMX8 to reach MTLOSW, as previously described. From blocks 122 and 124, the methodology advances to decision block 126 and checks the state of the MTV solenoid control bit (SPIOUT:MTVSOL) to determine whether the intake MTV 20 is currently opened or closed (in engine speed Region #2 of FIG. 2, the desired state of the intake MTV 20 is "opened" if the throttle is at WOT). If the intake MTV 20 is currently closed, the methodology advances to a section that determines if there is sufficient time to open the intake MTV 20 before it is desired to close the intake MTV 20 again when RPMX8 reaches either MTHISW or MTLOSW. In block 128, the methodology subtracts the sum of time delays (MTOPTM+MTVDLY+MTCLTM) from the time the engine will take to reach either MTHISW or MTLOSW. The methodology then advances to decision block 13 and determines if that difference is greater than zero (0). If the difference is greater than zero, the methodology advances to bubble 75 to be described. If the difference is not greater than zero, the methodology advances to bubble 109 to be described.

In decision block 126, if the intake MTV 20 is open, the methodology advances to block 132 and subtracts the time delay MTCLTM from the time the engine will take to reach either MTHISW or MTLOSW. The methodology then advances to decision block 134 where it determines if that difference is greater than zero (0). If the difference is less than or equal to zero, the methodology advances to bubble 100 to be described. If the difference is greater than zero, the methodology advances to block 136 and stores the difference to MTVCDT and clears the MTV desired flag bit (e.g., MTVFLG:MTVDES=0) to signify "close valve" is desired when MTVCDT reaches zero. The methodology then advances to bubble 109 in FIG. 4F to be described.

Referring to FIG. 4E, in decision block 98, the methodology determines whether the engine speed change over the last control period MTDRPM is greater than or equal to a predetermined minimum value (MTVMIN). If not, the methodology advances to bubble 100 in FIG. 4F to be described. If MTDRPM is greater than or equal to MTVMIN, the methodology advances to decision block 138 and checks the state of the acceleration mode flag bit (MTVMOD) to determine whether the engine is in acceleration (accel). If the engine is accelerating (e.g., if MTVMOD=1), the methodology advances to bubble 100 to be described. If the engine is not accelerating (e.g., MTVMOD=0), the methodology advances to decision block 140 and checks the state of the MTV solenoid control bit (SPIOUT:MTVSOL) to determine whether the intake MTV 20 is currently open or closed (in engine speed Region #3 of FIG. 2, the desired state of the intake MTV 20 is "closed" if the throttle is at WOT). If the intake MTV 20 is currently open, the methodology advances to a section that determines if there is enough time to close the intake MTV 20 before it is desired to open the intake MTV 20 again when RPMX8 reaches MTHISW.

In block 142, the methodology calculates the approximate time for RPMX8 to reach MTHISW, as previously described. The methodology then advances to block 143. In block 143, the methodology subtracts the sum of time delays (MTCLTM+MTVDLY+MTOPTM) from the time it is expected to take for RPMX8 to reach MTHISW. The methodology then advances to decision block 144 and determines if the difference between blocks 142 and 143 is greater than zero (0). If the difference is greater than zero, the methodology advances to bubble 100 to be described (immediately close the MTV). If the difference is less than or equal to zero, the methodology advances to bubble 109 to be described (exit the routine).

Referring back to decision block 140, if the intake MTV 20 is currently closed, the methodology advances to a section that determines if there is enough time to open the intake MTV 20 before it is desired to close the intake MTV 20 again when RPMX8 reaches MTLOSW. In block 146, the methodology calculates the approximate time for RPMX8 to reach MTLOSW, as previously described. The methodology then advances to block 147. In block 147, the methodology subtracts the sum of time delays (MTOPTM+MTVDLY+MTCLTM) from the time it is expected to take for RPMX8 to reach MTLOSW. The methodology then advances to decision block 148 and determines if the difference between blocks 146 and 147 is greater than zero (0). If the difference is less than or equal to zero, the methodology advances to bubble 109 to be described (exit the routine). If the difference is greater than zero, the methodology advances to block 150.

In block 150, the methodology calculates the approximate time for RPMX8 to reach MTHISW, as previously described. The methodology then advances to block 151. In block 151, the methodology subtracts the time delay MTOPTM from the time it is expected to take for RPMX8 to reach MTHISW. The methodology then advances to decision block 15 and determines if the difference between blocks 150 and 151 is greater than zero (0). If the difference is less than or equal to zero, the methodology advances to bubble 75 to be described (immediately open the intake MTV 20). If the difference is greater than zero, the methodology advances to block 154 and stores the difference to MTVCDT and sets the MTV desired flag bit (e.g., MTVFLG:MTVDES=1) to signify "open valve" is desired when MTVCDT reaches zero. The methodology then advances to bubble 109 in FIG. 4F to be described (exit the routine).

In FIG. 4F, from bubble 109, the methodology advances to block 156 and prepares for the next execution of MTVCTL by storing MTVPRD to MTVCPC and RPMX8 to MTVOLD. The methodology returns through bubble 158. From bubbles 75 and 100, the methodology advances to blocks 56 and 54, respectively, to perform the subroutines previously described. When the subroutines are completed, the methodology advances to block 156 as previously described.

The present invention has been described in an illustrative manner. It is to be understood that the terminology which has been used is intended to be in the nature of words of description rather than of limitation.

Many modifications and variations are possible in light of the above teachings. Therefore, within the scope of the appended claims, the present invention may be practiced other than as specifically described.

What is claimed is:

1. A method of controlling an intake manifold tuning valve (MTV) for an internal combustion engine, said method comprising the steps of:
   sensing the position of the throttle;
   determining whether the throttle position is greater than or equal to wide open throttle (WOT);
   opening the intake MTV if the throttle position is not greater than or equal to WOT;
   sensing the speed of the engine if the throttle position is greater than or equal to WOT;
   determining whether the engine speed is outside a range between first and second predetermined speeds;
   closing the intake MTV if the engine speed is outside the range between first and second predetermined speeds; and
   opening the intake MTV if the engine speed is not outside the range between first and second predetermined speeds.

2. A method as set forth in claim 1 wherein said step of determining the engine speed comprises:
   determining whether the sensed engine speed is less than a predetermined low manifold tuning switching speed;
   closing the intake MTV if the sensed engine speed is less than the predetermined low manifold tuning switching speed;
   determining whether the sensed engine speed is less than a predetermined high manifold tuning switching speed if the sensed engine speed is not less than the predetermined low manifold tuning switching speed;
   opening the intake MTV if the sensed engine speed is less than the predetermined high manifold tuning switching speed; and
   closing the intake MTV if the sensed engine speed is not less than the predetermined high manifold tuning switching speed.

3. A method of controlling an intake manifold tuning valve (MTV) for an internal combustion engine, said method comprising the steps of:
   sensing the position of the throttle;
   determining whether the throttle position is greater than or equal to wide open throttle (WOT);
   opening the intake MTV if the throttle position is not greater than or equal to WOT;
   sensing the speed of the engine if the throttle position is greater than or equal to WOT;
   determining whether the sensed engine speed is less than a predetermined low manifold tuning switching speed;
   closing the intake MTV if the sensed engine speed is less than the predetermined low manifold tuning switching speed;
   determining whether the sensed engine speed is less than or equal to a predetermined high manifold tuning switching speed if the sensed engine speed is not less than the predetermined low manifold tuning switching speed;
   closing the intake MTV if the sensed engine speed is not less than or equal to the predetermined high manifold tuning switching speed; and
   opening the intake MTV if the sensed engine speed is less than or equal to the predetermined high manifold tuning switching speed.

4. A method of controlling an intake manifold tuning valve (MTV) for an internal combustion engine including a solenoid for opening and closing the MTV, an engine speed sensor and a throttle position sensor, said method comprising the steps of:
   decrementing a MTV count down timer;
   determining if the MTV count down timer is equal to a predetermined value;
   determining whether to open or close the intake MTV if the MTV count down timer is equal to the predetermined value;
   opening the intake MTV immediately if the intake MTV is determined to be open;
   closing the intake MTV immediately if the intake MTV is determined to be closed;
   decrementing a MTV control period counter if the MTV count down timer does not equal the predetermined value;
   determining if the MTV control period counter is equal to a predetermined value; and
   performing anticipatory intake MTV control if the MTV control period counter is not equal to the predetermined value,
   said step of performing anticipatory intake MTV control comprises:
   determining if the sensed throttle position is greater than or equal to wide open throttle (WOT),
   opening the intake MTV immediately if the throttle position is not greater than or equal to WOT, and
   determining if the sensed engine speed is less than a predetermined low manifold tuning switching speed (MTLOSW) if the throttle position is greater than or equal to WOT;
   performing said anticipatory intake MTV control in a region before MTLOSW if the sensed engine speed is less than MTLOSW;
   determining whether the sensed engine speed is less than a predetermined high manifold tuning switching speed (MTHISW) if the sensed engine speed is not less than MTLOSW;
   performing said anticipatory intake MTV control in a region between MTLOSW and MTHISW if the sensed engine speed is less than MTHISW; and
   performing said anticipatory intake MTV control in a region above MTHISW if the sensed engine speed is not less than MTHISW.

5. A method as set forth in claim 4 including the steps of:
   calculating an engine speed change over a current control period if the sensed throttle position is greater than or equal to WOT;
   determining if the calculated engine speed change is positive or negative;

negating the calculated engine speed change to a positive value if the calculated engine speed change is negative;

clearing an acceleration mode flag;

setting an acceleration mode flag if the calculated engine speed change is positive;

determining if the absolute value of the calculated engine speed change is greater than a predetermined maximum value;

using the calculated engine speed change if the calculated engine speed change is not greater than the predetermined maximum value; and using the predetermined maximum value if the calculated engine speed change is greater than the predetermined maximum value.

6. A method as set forth in claim 5 wherein said step of performing anticipatory intake MTV control in a region before MTLOSW comprises:

determining whether the calculated engine speed change is greater than or equal to a predetermined minimum value;

determining whether the engine is in deceleration if the engine speed change over the last control period is greater than or equal to a predetermined minimum value;

closing the intake MTV immediately if either the calculated engine speed change is not greater than or equal to a predetermined minimum value or the engine is in deceleration;

determining whether the intake MTV is open or closed if the engine is not in deceleration;

calculating the time until the sensed engine speed equals MTLOSW if the intake MTV is open;

subtracting the amount of time to close the intake MTV, pause and open the intake MTV from the calculated time for the sensed engine speed to equal MTLOSW;

determining if a difference between the calculated time and the subtracted time is greater than a predetermined value; and closing the intake MTV immediately if the determined difference is greater than a predetermined value.

7. A method as set forth in claim 6 including the steps of:

calculating the amount of time until the sensed engine speed equals MTHISW if the intake MTV is closed;

subtracting the amount of time to open the intake MTV, pause and close the intake MTV from the calculated time;

determining if a second difference between the calculated time and subtracted time is greater than a predetermined value;

calculating the amount of time until the sensed engine speed equals MTLOSW if the second difference is greater than a predetermined value;

subtracting the amount of time it takes to open the intake MTV from the time for the sensed engine speed to equal MTLOSW;

determining if a third difference between the calculated time and the subtracted time is greater than a predetermined value;

opening the intake MTV immediately if the third difference is not greater than a predetermined value; and opening the intake MTV at a future time if the third difference is greater than a predetermined value.

8. A method as set forth in claim 5 wherein said step of performing anticipatory intake MTV control in a region between MTLOSW and MTHISW comprises:

determining if the calculated engine speed change is greater than or equal to a predetermined minimum value;

opening the intake MTV immediately if the calculated engine speed change is not greater than or equal to a predetermined minimum value;

determining whether the engine is in acceleration if the calculated engine speed change is greater than or equal to a predetermined value;

calculating the amount of time until the sensed engine speed equals the low manifold tuning switching speed (MTLOSW) if the engine is not in an acceleration;

calculating the amount of time until the sensed engine speed equals the high manifold tuning switching speed (MTLOSW) if the engine is in an acceleration;

determining if the intake MTV is open or closed;

subtracting the sum of time delays from the amount of time the engine will take to equal either MTLOSW or MTHISW;

determining if a difference between the sum of time delays and the time the engine will take to equal either MTLOSW or MTHISW is greater than a predetermined value; and opening the intake MTV immediately if the difference is greater than a predetermined value.

9. A method as set forth in claim 8 including the steps of:

subtracting a time delay from the time the sensed engine speed will take to equal either MTLOSW or MTHISW;

determining if a difference between the time delay and the time the engine speed will take to equal either MTLOSW or MTHISW is greater than a predetermined value;

closing the intake MTV immediately if the difference is not greater than a predetermined value; and closing the intake MTV at a future time if the difference is greater than a predetermined value.

10. A method as set forth in claim 5 wherein said step of performing anticipatory intake MTV control in a region above MTHISW comprises:

determining if the calculated engine speed change is greater than or equal to a predetermined minimum value;

determining whether the engine is in acceleration if the calculated engine speed change is greater than or equal to a predetermined value;

closing the intake MTV immediately if either the calculated engine speed change is not greater than or equal to a predetermined minimum value or the engine is in acceleration; 'determining whether the intake MTV is open or closed if the engine is not in acceleration;

calculating the amount of time until the sensed engine speed equals a high manifold tuning switching speed (MTHISW) if the intake MTV is open;

subtracting the sum of time delays from the calculated time;

determining if a difference between the calculated time and subtracted time is greater than a predetermined value; and closing the intake MTV immediately if the difference is greater than a predetermined value.

11. A method as set forth in claim 10 including the steps of:

calculating the amount of time until the sensed engine speed equals a low manifold tuning switching speed (MTLOSW) if the intake MTV is closed;

subtracting the sum of time delays from the calculated time;

determining whether a difference between the calculated time and subtracted time is greater than a predetermined value;

calculating the time until the sensed engine speed is equal to a high manifold tuning switching speed (MTHISW) if the difference is greater than a predetermined value;

subtracting a time delay from the time the sensed engine speed will take to equal MTHISW;

determining whether a difference between the calculated time and the subtracted time is greater than a predetermined value;

opening the intake MTV immediately if the difference is not greater than a predetermined value; and opening the intake MTV at a future time if the difference is greater than a predetermined value.

12. A method as set forth in claim 8 including the step of adding the intake MTV close time, the intake MTV delay time, and the intake MTV open time to get the said sum of time delays.

13. A method as set forth in claim 10 including the step of adding the intake MTV open time, the intake MTV delay time, and the intake MTV close time to get the said sum of time delays.

* * * * *

UNITED STATES PATENT AND TRADEMARK OFFICE
CERTIFICATE OF CORRECTION

PATENT NO. : 5,197,433
DATED : March 30, 1993
INVENTOR(S) : Dykstra, et al

It is certified that error appears in the above-indentified patent and that said Letters Patent is hereby corrected as shown below:

```
On the title page, under item [76], insert the following:
     [73]  Assignee:  Chrysler Corporation, Auburn Hills, Mi.
```

Signed and Sealed this

Twenty-first Day of June, 1994

*Attest:*

BRUCE LEHMAN

*Attesting Officer*      *Commissioner of Patents and Trademarks*